United States Patent Office 2,970,085
Patented Jan. 31, 1961

2,970,085

PREPARATION OF 11,17-DIHYDROXY STEROIDS

Eugene L. Dulaney, Metuchen, and William J. McAleer, Roselle, N.J., assignors to Merck & Co., Inc., Rahway, N.J., a corporation of New Jersey No Drawing. Filed Feb. 5, 1957, Ser. No. 638,227

6 Claims. (Cl. 195—51)

This invention relates to processes for introducing oxygen substituents into a steroid molecule and particularly to processes for preparing oxygenated steroids by subjecting desoxy steroids to the action of oxygenating strains of microorganisms or their oxygenating enzymes.

This application is a continuation-in-part of Serial No. 500,292, filed April 8, 1955, now abandoned.

The discovery of the remarkable therpetic properties of cortisone, hydrocirtisone and related compounds has stimulated wide interest in finding simpler and more economical methods of preparing such compounds. Heretofore, these compounds were primarily produced through highly involved synthesis necessitating a considerable number of separate steps, the number required necessarily depending upon the starting material. As an example, a typical synthesis of hydrocortisone from relatively inexpensive desoxycholic acid involves approximately forty separate reactions. The most difficult steps in the synthesis of these compounds is the introduction of oxygen substituents at various positions of the steroid molecule, particularly at the 11, 17 and 21 carbon atoms. Because of the difficulty in introducing these oxygen substituents, proper selection of the starting material and the sequence and number of operations are important factors. The selection of the starting material requires a proper balance between cost and ease of oxygenation, which necessitates extensive research to determine which are the most promising.

The oxygenation of steroids by fermentation procedures through the action of particular oxygenating strains of microorganisms or their oxygenating enzymes has been recently proposed. For example, the U.S. Patent No. 2,602,769, issued to Herbert C. Murray and Durey H. Peterson on July 8, 1952, discloses the use of oxygenating fungus of the order Mucorales and particularly of the families Mucoraceae and Choaneporaceae for producing primarily 11-oxygenated steroids. This patent also discloses the preparation of compounds oxygenated at the 6 or 8 position as well as of mixtures of various other oxygenated products. The U.S. Patents No. 2,649,400, issued to Murray and Peterson, No. 2,649,401, issued to William J. Haines and Donald H. Colingsworth, and No. 2,649,402, issued to Murray and Peterson, all on August 18, 1953, disclose the use of oxygenating strains of the genera Penicillium, Streptomyces and Aspergillus for oxygenating the 11-position of steroids. Although the processes disclosed in most of these patents are utilized primarily for the production of 11-oxygenated steroids certain of these disclose processes for the preparation of products having other oxygenated positions. The aforementioned Patent No. 2,602,769 discloses the formation of products having more than one postion oxygenated. The processes disclosed in the latter patent for preparing the desired multi-oxygenated products (i.e., products which have undergone oxygenation at two or more positions of the steroid molecule), however, results in the formation of a multiplicity of other undesired oxygenated products including mixtures of stereoisomers and position isomers, rather than an appreciable amount of a single product. The yields of the individual desired products are very low, and, because of the different types of mixtures obtained, extremely complicated extraction procedures are required to separate them from each other. It is apparent, therefore, that it is not feasible to prepare multi-oxygenated steroids in commercial amounts by these processes.

The desirability of being able to produce a multi-oxygenated steroid in good yields, and particularly one that has the particular positions oxygenated that are necessary for forming valuable hormones, by fermentation procedures, is readily apparent. Such a method would enable the elimination of many complex steps that were heretofore found necessary in order to produce the hormonally active steroids; and, possibly more important, it would eliminate the necessity for careful selection of the starting material, thus making possible the utilization for this purpose inexpensive materials hitherto considered impractical for hormone production.

A primary object to the present invention is to produce oxygenated steroids by a process not subject to the difficulties encountered in the processes previously available. A related object is to produce dioxygenated steroids by a fermentation process in economically feasible yields without the formation of undesirable side-products. A further object is to provide, by simple and effective processes, direct oxygenation of the 11 and 17 carbon atoms of steroids using fermentation procedures. Other subjects and the advantages of the invention will appear hereinafter.

In accordance with the present invention the dioxygenation of steroids is conveniently effected in a single fermentation operation by subjecting steroids to the action of an oxygenating strain of fungi of the genera Dactylium, Cephalothecium or Scopulariopsis or to oxygenating enzymes produced by these microorganisms which will selectively oxygenate both the 11 and 17 carbon atom in the steroid molecule. The practice of the invention is particularly suitable for converting 11,17-desoxy-3,20-diketo-pregnenes or pregnadienes to the corresponding 11,17-dihydroxy-3,20-diketo compound, in high yields without the formation of undesirable side products. A feature of this process is that it provides means for oxygenating two positions of a steroid molecule without the formation also of a large number of unwanted oxygenated products, such as stereoisomers and position isomers which result in low yields of the desired products and requires complicated extraction procedures to separate them from the wanted products.

In accordance with the invention, the dioxygenation takes place with only one fermentation operation, thereby eliminating the necessity of separating the components after each oxygenation period as would be necessary if each oxygenation step was performed singly. This is an advantage since it greatly increases the yield over what could be obtained in separate fermentation operations, and since in, the latter case, there is always a significant portion of the desired oxygenated steroid lost through the recovery procedure used for separating the desired product from the fermentation broths. In the processes in accordance with this invention, it has been found that the loss due to the recovery is substantially reduced and because of the high cost of the compounds produced, any reduction in recovery loss has a considerable economic value.

The oxygenating strains of the genera Dactylium, Cephalothecium and Scopulariopsis employed in the process of the invention are of the class Fungi Imperfecti and the order Moniliales. The later genus is of the family Tuberculariaceae and remainder are all in the family Moniliaceae. The genus name Cephalothecium is commonly accepted as interchangeable with the genus name Trichothecium and the two names are used interchangeably in this application. Species of the organisms which are particularly useful in the process of the invention are deposited in the culture collection of the Northern Regional Research Laboratories, Peoria, Illinois, under the following numbers:

*Dactylium dentroides:*
  QM 508, NRRL 2574
  QM 513, NRRL 2575
*Trichothecium (Cephalothecium) roseum:*
  QM 599, NRRL 2577
  QM 936, NRRL 2576
*Scopulariopsis brevicaulis:*
  MF 852, NRRL 1103

Various strains of this microorganism can be obtained from known sources such as the Northern Regional Research Laboratories, Peoria, Illinois, or American Type Culture Collection, Washington, D.C., or Quartermaster Corps., Natick, Massachusetts, or Centraalbureau voor Schimmelcultures, Baarn, Holland.

In carrying out the process of this invention, the steroid to be oxygenated is subjected to the action of an oxygenating enzyme produced by growing an oxygenating strain of fungi of one of the genera Dactylium, Trichothecium (Cephalothecium) or Scopulariopsis. This is conveniently accomplished by growing the microorganism under aerobic conditions in a suitable nutrient medium in intimate contact with the steroid to be oxygenated; the culturing growth of the microorganism being continued until the desired oxygenation has occurred. Alternately the process is effected by the use of homogenized resting cells by first growing the microorganism in a suitable fermentation medium under aerobic conditions and then separating the cells from the fermentation medium and adding the steroid to these resting cells and continuing the aerobic conditions for sufficient time to effect the desired oxygenation. The use of resting cells has the advantage of simplifying the recovery procedure.

The steroid can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the steroid be present in very finely divided form in order to permit maximum contact with the oxygenating culture medium and insure completion of the reaction. All of the steroid can be added at one time or the addition can be continuous or intermittent over a period of time.

The process of the present invention can be effected in both stationary and submerged cultures of the microorganism growing under aerobic conditions, although for practical purposes it is most conveniently carried out by growing the microorganism under submerged conditions in a suitable aqueous fermentation medium containing the steroid. The amount of the steroid which can be conveniently oxygenated by our method will depend in part upon the particular medium employed.

Aqueous nutrient medium suitable for the growing of oxygenating strains of the microorganisms must contain sources of assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermentation processes such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts such as suitable soluble salts of magnesium, zinc, potassium, sodium, phosphorous, and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in our process of oxygenating steroids:

MEDIUM No. 1

|  | G. |
|---|---|
| Commercial dextrose (cerelose) | 50.00 |
| Commercial lactalbumin digest (Edamine) | 20.00 |
| Corn steep liquor | 5.00 |

Distilled water is added to give a total volume of 1 liter of nutrient medium and the pH adjusted to 6.5 with sodium hydroxide.

MEDIUM NO. 2

| Commercial lactalbumin digest (Edamine) | 20.0 |
|---|---|
| Inverted black strap molasses | 100.0 |
| Corn steep liquor | 5.0 |

Distilled water is added to give a total volume of 1 liter of nutrient medium and the pH adjusted to 6.5 with sodium hydroxide.

MEDIUM NO. 3

| Inverted black strap molasses | 100.0 |
|---|---|
| Corn steep liquor | 5.0 |

Distilled water is added to give a total volume of 1 liter of nutrient medium and the pH adjusted to 6.5 with sodium hydroxide.

MEDIUM NO. 4

| Inverted black strap molasses | 100.0 |
|---|---|
| Corn steep liquor | 20.0 |

Distilled water is added to give a total volume of 1 liter of nutrient medium and the pH adjusted to 6.5 with sodium hydroxide.

MEDIUM NO. 5

| Inverted black strap molasses | 50.0 |
|---|---|
| Corn steep liquor | 6.3 |

Distilled water is added to give a total volume of 1 liter of nutrient medium and the pH adjusted to 6.5 with sodium hydroxide.

MEDIUM NO. 6

| Dextrose | 50.0 |
|---|---|
| $(NH_4)_2HPO_4$ | 7.5 |
| $K_2HPO_4$ | 1.0 |
| $MgSO_4 \cdot 7H_2O$ | 0.5 |
| KCl | 0.5 |
| $FeSO_4 \cdot 7H_2O$ | 0.01 |
| $ZnSO_4 \cdot 7H_2O$ | 0.01 |

Distilled water is added to give a total volume of 1 liter of nutrient medium and the pH adjusted to 6.5 with sodium hydroxide.

The addition of minor amounts of anti-foaming agents, although not essential, is desirable with some fermentation mediums. It has been found that the addition to certain fermentation mediums of a substituted oxazaline which is a nonvolatile, amine-type, cationic surface active agent available under the trade name "Alkaterge C" is particularly effective in reducing the amount of foam, although other antifoam agents known to be useful for this purpose can also be used.

As indicated above, the process of this invention results in the oxygenation of 11,17-desoxy pregnenes to obtain the corresponding $11\alpha,17\alpha$-dihydroxy compound. Other streoids, however, can be oxygenated thereby producing suitable intermediates in the preparation of hormones. Thus, this process is applicable in general to saturated and unsaturated cyclopentanopolyhydrophenanthrene compounds. Such cyclopentanopolyhydrophenanthrene compounds can be unsubstituted such as at the 1, 4 and/or 5 position or can contain substituents such as keto, hydroxyl, acyloxy, halide, alkyl, and the like at various positions of the cyclopentanopolyhydrophenanthrene nucleus. In addition, such compounds may have at the 17 position a ketol side chain, a saturated or unsaturated hydrocarbon side chain, a carboxylic acid side chain, and the like. Examples of classes of such cyclopentanopolyhydrophenanthrene compounds that might be mentioned are pregnanes, allopregnanes, pregnadienes, androstanes, bile acids and their esters, sterols, sapogenins, and derivatives thereof. Thus, representative steroids having 11,17-desoxy groups such as: pregnane-3,20-dione; pregnane-21-ol-3,20-dione; 4-pregnene-21-ol-3,20-dione; 4-pregnene-21-ol-3,20-dione-21-acetate; 4-pregnene-21-ol-3,20-dione-21-benzoate; 1,4-pregnadiene-3,20-dione; 1,4-pregnadiene-21-ol-3,20-dione; 1,4-pregnadiene-21-ol-3,20-dione-21-acetate; 9$\alpha$-fluoro-4-pregnene-21-ol-3,20-dione-21-acetate; 9$\alpha$-bromo-4-pregnene-21-ol-3,20-dione-21-acetate; 9$\alpha$-chloro-4-pregnene-21-ol-3,20-dione-21-acetate; and the like as well as other 21-esters thereof such as the propionate, butyrate, hydrocinnamate, succinate, $\alpha$-naphthylacetate, $\alpha$-naphthate, t-butylacetate and trimethylacetate can be oxygenated at positions 11 and 17 to obtain the corresponding 11$\alpha$,17$\alpha$-dihydroxy derivatives.

For example, a 11,17-desoxy pregnene can be oxygenated in accordance with the following procedure: A sterile culture medium, such as those shown above, is first inoculated by introducing a small amount of spore suspension or vegetative growth of an oxygenating strain of the microorganism. The inoculated nutrient medium is then incubated at a temperature of about 20–45° C., while being agitated in the presence of oxygen for a period of about a few hours to several days. At this point, a solution of a 11,17-desoxy pregnene in a solvent such as propylene glycol is added to the fermentation medium and the agitation and aeration of the nutrient medium continued for about 5 to 30 hours, or until the oxygenation reaction is completed.

When the oxygenation is complete, the oxygenated steroid may be recovered from the fermentation broth by extraction with a suitable water immiscible organic solvent for the oxygenated streoids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired product which may be further purified by recrystallization or other procedures conventional in the art.

Alternatively, the process of this invention can be effected by contacting the oxygenating enzymes produced by the fermentation of any of the microorganisms with the streoid to be oxygenated. This can be accomplished by recovering the oxygenating enzymes from a fermentation broth or from the mycelial growth in accordance with procedures known in the art, and intimately contacting such enzymes with a steroid in an aqueous medium.

The following examples are given for purposes of illustration:

*Example 1*

Each of the four samples of approximately 50 ml. of a culture medium having the composition described as medium No. 1 were sterilized for 20 minutes at 120° C. in a 250 ml. flask. Each of the mediums were then inoculated with approximately five ml. of a vegetative growth of the species *Dactylium dendroides* QM 508 (NRRL 2574). The mixture is then agitated using a rotary shaker at an agitation speed of 220 r.p.m., while maintaining the temperature at 28° C. for approximately 96 hours. A sterile solution of 20 mg. of 4-pregnene-3,20-dione in 0.5 ml. of dimethylformamide is added to each of the fermented medium and the agitation continued at the same rate for approximately 48 hours for two of the mediums and 96 hours for the remaining two. The batches are filtered and extracted with chloroform. The chloroform extracts are developed on a paper chromatogram using the Zaffaroni technique reported in Science III, 6 (1950) and the solvent system benzene/formamide:methanol. A spot is observed with an $R_f$ corresponding to 4-pregnene-11$\alpha$,17$\alpha$-diol-3,20-dione and gives a vanillin-sulfuric acid test characteristic of 4-pregnene-11$\alpha$,17$\alpha$-diol-3,20-dione.

*Example 2*

A process is carried out in the same manner as in Example 1 with 50 ml. of a vegetative growth of the species *Dactylium dendroides* QM 513 (NRRL 2575). The fermentation is continued for the same period of time and the products separated from the broth and chromatographed on paper. They give a spot with the mobility of 4-pregnene-11$\alpha$,17$\alpha$-diol-3,20-dione.

*Example 3*

A process is carried out in the same manner as in Example 1 with 50 ml. of a vegetative growth of the same species and 20 mg. of 4-pregnene-21-ol-3,20-dione is added in place of the 4-pregnene-3,20-dione. The fermentation is continued for 24 and 72 hours. The samples are combined, the steroids extracted and then separated on paper chromatograms. A product with the mobility of 4-pregnene-11$\alpha$,17$\alpha$,21-triol-3,20-dione is present.

*Example 4*

Approximately 3.2 liters of a culture medium having the composition described as medium No. 5 is sterilized for 30 minutes at 120° C. in a five liter flask. The medium is then inoculated with approximately 250 ml. of a vegetative growth of the species *Dactylium dendroides* QM 508 (NRRL 2574). The mixture is then agitated and aerated for approximately 24 hours, maintaining the temperature at 28° C. A sterile solution of 800 mg. of 4-pregnene-3,20-dione in 10 ml. of dimethylformamide is added to the fermentation medium and the agitation and aeration continued at the same rate for 78 hours. At the end of this period the mycelial growth is separated by filtration. Filtered broth is agitated twice with 3 liter portions of ethyl acetate for 20 minutes, the layers separated and the spent broth discarded. The cake is agitated with a high speed stirrer with three liters of ethyl acetate, and filtered—the cake is then discarded. The ethyl acetate extracts are combined and washed with an equal volume of 5% aqueous sodium bicarbonate solution, followed by three equal volume washes of distilled water. (The solution is essentially neutral to pH paper by the third wash.) The ethyl acetate is then evaporated on a steam bath with vacuum to a volume of about 150 ml. At this point it consists of a very thick viscous oily mass, and is shaken with 50 ml. of acetone and set in the refrigerator overnight. Extraneous solid which separates is filtered off and discarded.

The filtrate is concentrated to near-dryness, partitioned between 70% aqueous methanol and an equal volume of petroleum ether. The aqueous methanol fractions are evaporated to remove the methanol, the aqueous residue is extracted with ethyl acetate; the combined ethyl acetate fractions evaporated and the residue set in the refrigerator overnight. Two crops of crystals are obtained. Paper strip chromatography shows the presence of the following: Progesterone and 11$\alpha$,17$\alpha$-dihydroxy progesterone.

The crude mixture of steroids is streaked on Whatman No. 4 (3 mm.) paper and developed in methanol:propylene glycol 1:1 and chloroform:toluene 1:1 for 16 hours. Position of the 11$\alpha$,17$\alpha$-diol band is determined by use of a hand-size ultra violet lamp and phosphor screen. Position of the 11$\alpha$,17$\alpha$-diol band is confirmed by streaking with vanillin reagent, which gives a deep orange color with the compound. The bands of 11$\alpha$,17$\alpha$-diol are cut out, combined and eluted with methanol.

The methanol solution is taken to dryness, partitioned between ethyl acetate and water. The ethyl acetate layers are combined, dried and concentrated. Two batches of crystals are obtained and recrystallized from ethyl acetate to give 72.4 mg. of 11α,17α-dihydroxy progesterone. A mixed chromatograph of the diol isolated with authentic 11α,17α-dihydroxy progesterone shows only one U.V. product identical in position with the authentic diol. Melting point 224–227° C. Remelts 248–251° C. (Micro-hot stage.) Lit. remelt temp. 246–248° C. Gives positive color test with vanillin reagent, deep orange characteristic of the 17α-hydroxy group. Sulfuric acid chromagen identical with 11α,17α-dihydroxy progesterone.

$\lambda_{Max.}^{H_2SO_4}$ 290 m$\mu$, 370 m$\mu$, 450 m$\mu$, I.R. $\lambda_{Max.}^{Nujol}$ 2.93$\mu$, 5.82$\mu$, 6.02$\mu$, 6.18$\mu$ identical with reference diol. Specific rotation: $[\alpha]_D^{24}$ +74 (c.=1.0 in MeOH).

*Example 5*

A process is carried out in the same manner as Example 1 with the following microorganisms: *Trichothecium (Cephalothecium) roseum* QM 599 (NRRL 2577), *Trichothecium (Cephalothecium) roseum* QM 936 (NRRL 2576), and *Scopulariopsis brevicaulis* (NRRL 1103). The products spotted and developed as in Example 1 show significant quantities of the oxidation product opposite 4-pregnene-11α,17α-diol-3,20-dione.

Any departure from the above description which conforms to the present invention is intended to be included within the scope of the claims.

What is claimed is:

1. A process for the production of oxygenated steroids, which comprises subjecting a 11,17-desoxy pregnene under aerobic conditions for at least 48 hours to the action of an oxygenating enzyme produced by an oxygenating strain of a microorganism of the species *Dactylium dendroides* to produce the corresponding 11α,17α-dihydroxy pregnene and recovering said 11α,17α-dihydroxy steroid.

2. The process of claim 1, wherein the 11,17-desoxy pregnene is 4-pregnene-3,20-dione.

3. The process of claim 1, wherein the 11,17-desoxy pregnene is 4-pregnene-21-ol-3,20-dione.

4. A process for the production of oxygenated steroids, which comprises subjecting 4-pregnene-3,20-dione under aerobic conditions for at least 48 hours to the action of an oxygenating enzyme produced by an oxygenating strain of *Scopulariopsis brevicaulis* to produce 4-pregnene-11α,17α-dihydroxy-3,20-dione and recovering said 11α,17α-dihydroxy steroid.

5. A process for the production of oxygenated steroids which comprises subjecting an 11,17-desoxy pregnene under aerobic conditions for at least 48 hours to the action of an oxygenating enzyme produced by an oxygenating strain of *Dactylium dendroides* (NRRL 2574) to produce the corresponding 11α,17α-dihydroxy pregnene and recovering said 11α,17α-dihydroxy steroid.

6. A process for the production of oxygenated steroids which comprises subjecting an 11,17-desoxy pregnene under aerobic conditions for at least 48 hours to the action of an oxygenating enzyme produced by an oxygenating strain of *Dactylium dendroides* (NRRL 2575) to produce the corresponding 11α,17α-dihydroxy pregnene and recovering said 11α,17α-dihydroxy steroid.

References Cited in the file of this patent

UNITED STATES PATENTS

| 2,721,828 | Murray | Oct. 25, 1955 |
| 2,762,747 | Murray | Sept. 11, 1956 |
| 2,765,258 | Shull | Oct. 2, 1956 |
| 2,793,162 | Thoma et al. | May 21, 1957 |

OTHER REFERENCES

Experientia, vol. IX, No. 10, 1953, pp. 371–372.

Meister et al.: Jour. Am. Chem. Soc., 76, August 5, 1954, pp. 4050–4051.

Mystre et al.: Helvetica Chimica Acta, 37, 1954, pp. 1548–1553.